United States Patent [19]

Kao

[11] 4,265,515
[45] May 5, 1981

[54] OPTICAL FIBER WAVEGUIDE WITH EFFECTIVE REFRACTIVE INDEX PROFILE

[75] Inventor: Charles K. Kao, Roanoke, Va.

[73] Assignee: International Telephone and Telegraph Corporation, New York, N.Y.

[21] Appl. No.: 968,326

[22] Filed: Dec. 11, 1978

Related U.S. Application Data

[63] Continuation of Ser. No. 904,092, May 8, 1978, abandoned, which is a continuation-in-part of Ser. No. 632,046, Nov. 14, 1975, abandoned.

[51] Int. Cl.³ ............................................... G02B 5/14
[52] U.S. Cl. ................................................ 350/96.33
[58] Field of Search ........................... 350/96.31, 96.33

[56] References Cited
U.S. PATENT DOCUMENTS

| | | | |
|---|---|---|---|
| 4,000,416 | 12/1976 | Goell | 350/96.33 |
| 4,070,091 | 1/1978 | Taylor et al. | 350/96.33 |
| 4,149,772 | 4/1979 | Iyengar et al. | 350/96.33 |

*Primary Examiner*—Stewart J. Levy
*Attorney, Agent, or Firm*—John T. O'Halloran; Peter C. Van Der Sluys

[57] ABSTRACT

An effective graded index profile optical fiber waveguide comprises alternating regions of high and low indexes of refraction of controlled thickness. The effective refractive index of the fiber has a graded profile of decreasing refractive index when the regions of high index have either a constant or decreasing thickness and the low index regions increase outwardly from the center. The effective refractive index has a particular graded profile of refractive index when the thicknesses of the regions of low refractive index and the high refractive index are appropriately chosen.

9 Claims, 5 Drawing Figures

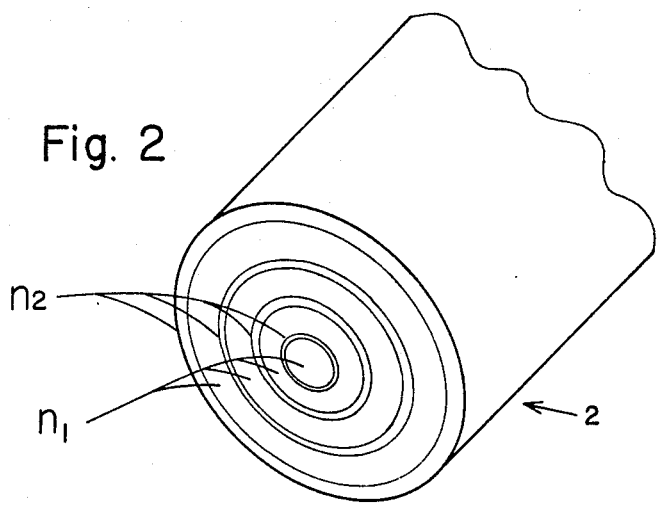
Fig. 2
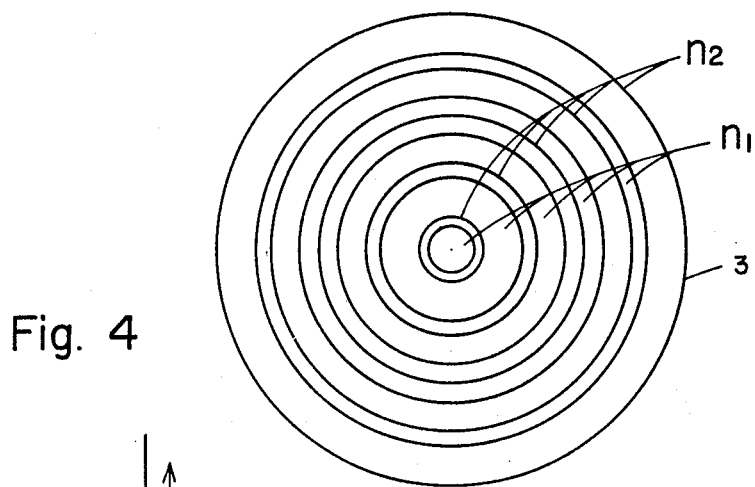
Fig. 4
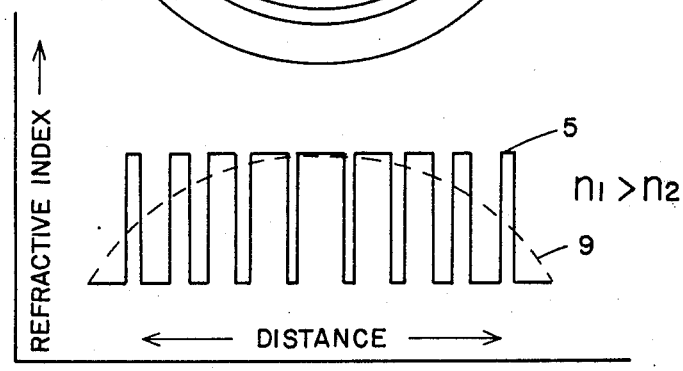

OPTICAL FIBER WAVEGUIDE WITH EFFECTIVE REFRACTIVE INDEX PROFILE

CROSS REFERENCES TO RELATED APPLICATIONS

This is a continuation of application Ser. No. 904,092 now abandoned, filed May 8, 1978, which is a continuation-in-part of application Ser. No. 632,046 now abandoned, filed Nov. 14, 1975.

BACKGROUND OF THE INVENTION

The increasing usage of glass optical fiber waveguides in the communications field has revealed a corresponding increase in problems inherent in the glass as a transmission medium. One of the problems with a glass waveguide having a core of a high index of refraction and a cladding of a low index of refraction is signal distortion caused by the time delay occurring in the transmission of light through the core. One attempt to eliminate this problem is to provide a waveguide having a core of graded refractive index. In the profiled index fiber the wave components traveling in the region farthest from the center of the core are transmitted in a correspondingly lower index material and subsequently move with a greater velocity. The main purpose for the graded index core, therefore, is to provide pulse transmission through long length optical fibers with minimum signal distortion due to the time delay.

Methods currently available for providing a graded index core to optical fiber waveguides by the use of the appropriate range of materials are generally capable of providing the index gradient profile within a high degree of accuracy. The decrease of refractive index as a function of radial distance from the core center must follow a defined mathematical relationship for the graded fiber to be effective.

The purpose of this invention is to provide a means of producing an optical fiber waveguide having an effective graded index region with the use of two alternating materials.

SUMMARY OF THE INVENTION

An optical waveguide having a guiding region of an effective index of refraction profile is provided by a plurality of first and second alternating concentric annular rings of light transmissive material. Each of the first and second alternating rings consists of a material of high and low refractive index, respectively. In one embodiment the thickness of the first rings remains constant and the thickness of the second rings varies in defined proportion to the distance outwardly from the center of the fiber. In an alternate embodiment the index of refraction of the first rings is greater than the index of refraction of the second rings and the thickness of both rings is varied.

BRIEF DESCRIPTION OF THE DRAWINGS

FIG. 2 is a front perspective view of an optical fiber according to this invention;

FIG. 4 is a graphic representation of the variation of refractive index of an alternate embodiment of the effective profile fiber of this invention.

DESCRIPTION OF THE PRIOR ART

Figure 1:
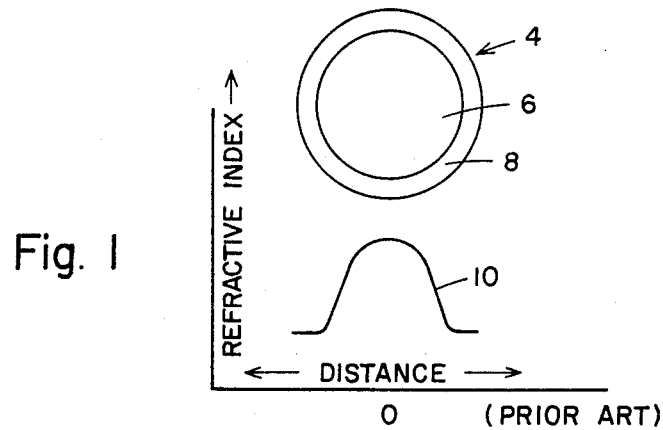
FIG. 1 is a graphic representation of the variation of refractive index with distance along the cross-section of an optical fiber of the prior art.

FIG. 1 shows a profiled index fiber 4 having a core region 6 and a cladding layer 8. The index of refraction of the core 6 is high relative to the index of refraction of the cladding 8, and varies from a high value at the center to a relatively lower value in close proximity to the cladding 8. The refractive index profile 10 is shown to vary in a quasi parabolic relationship outwardly from the center of the core material. Since the velocity of light in a glass transmissive medium is inversely proportional to the index of refraction of the medium, light therefore will travel at a greater rate at the peripheral regions of the core than at the center. The profiled index of refraction is used, for example, when fast repetition pulse rates are transmitted in optical communication systems to reduce pulse distortion occurring due to time delays.

DESCRIPTION OF THE PREFERRED EMBODIMENT

The effective profiled fiber of this invention can be seen by referring to FIG. 2 where the fiber 2 has a cross-section consisting of a plurality of concentric annular rings. In one embodiment the innermost ring has a refractive index $n_1$ and a fixed thickness. Each successive alternating ring has the same thickness and the same index of refraction $n_1$. The second series of alternating concentric rings are made from a material having an index of refraction $n_2$. For the second series of rings the thickness of the innermost ring is quite small and the thickness of the subsequent rings increases in defined proportion to the distance that the ring is situated from the center of the fiber cross-section.

Various methods may be employed for forming the effective index of refraction profile of this invention. One method for conveniently providing alternating layers of first and second index of refraction materials is by the chemical vapor deposition process. Here, for example, alternating layers of germania silicate and silica can be alternately applied to the inner surface of a silica tube.

Another method for rapidly providing the alternating layers of high and low index material could also consist of inserting alternating tubes of high index of refraction material with deposited low index material on the outer or inner surface and heating and drawing to form a resultant composite fiber.

When $n_1$ is selected from a material having a high index of refraction and $n_2$ is selected from a material having a relatively lower index of refraction, the light projected upon the fiber cross-section transmits through the fiber such that the waves within regions of low index of refraction are evanescent. When pulses of light are transmitted through the fiber of FIG. 2 having the aforementioned relationship where the index of refraction of the first set of concentric rings is $n_1$ and the index of refraction of the second set of concentric rings is $n_2$, and $n_1$ is greater than $n_2$, the light pulses exit from the opposite fiber end with very little distortion. At the exit face of the fiber light at the center has the highest brightness and decreases in brightness radially outwards.

Figure 3:
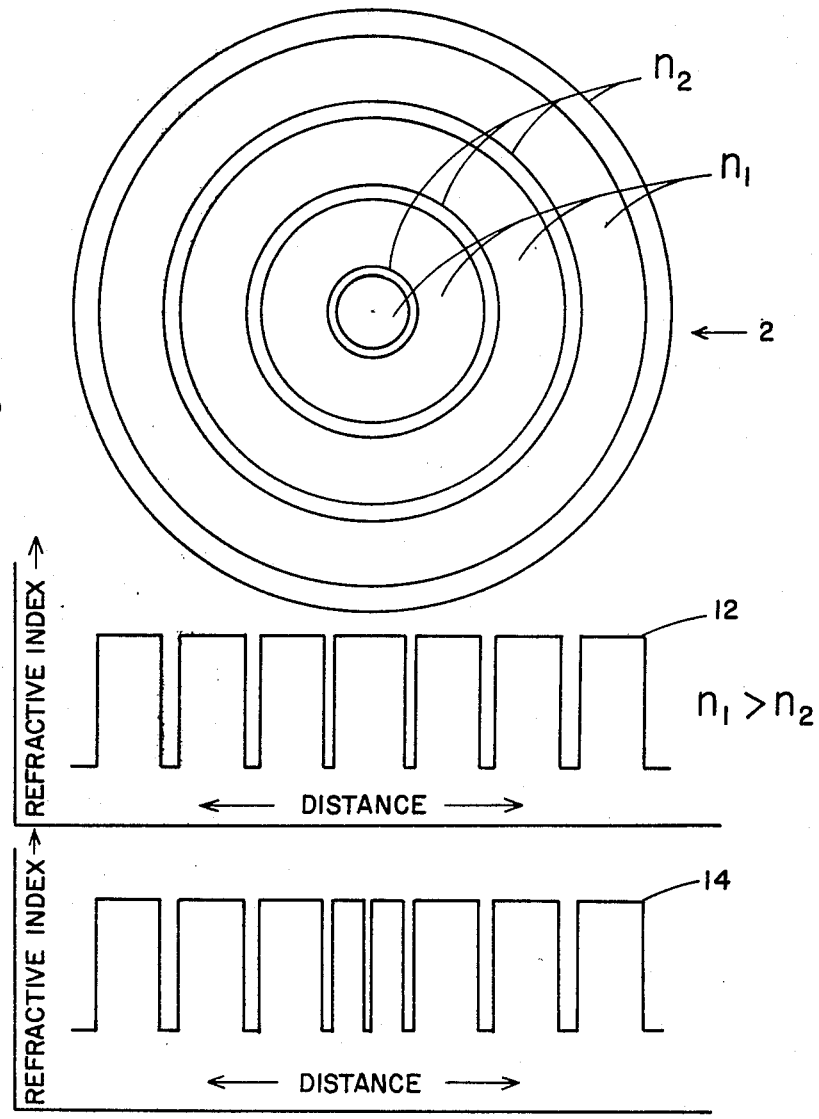
FIG. 3 is a graphic representation of the variation of refractive index along the cross-section of the fiber in FIG. 2.

The explanation for the effective index of refraction profile with the fiber of this invention can be seen by referring to FIG. 3.

FIG. 3 shows a greatly enlarged cross-section of a typical optical fiber 2 of this invention. The index of refraction is chosen such that the innermost ring is made from a material having an index of refraction $n_1$ and every other ring is made from the same material and has the same thickness as the innermost ring. For the purpose of this disclosure the rings made from the material having a first index of refraction $n_1$ and constituting the innermost ring is designated as the first series of rings, and the alternating group of rings made from the material having an index of refraction $n_2$ is designated as the second series of rings. The thickness of rings made from the material having index of refraction $n_1$ remains relatively constant as the rings proceed from the innermost region of the cross-section of fiber 2 outwardly in a radial direction from the center. The relationship between the first refractive index profile 12 and the distance from the center of the fiber cross-section is shown in FIG. 3 for the condition when the refractive index $n_1$ of the first series of rings is greater than the refractive index $n_2$ for the second series of rings. The relationship between the second refractive index profile 14 and the radial distance from the center of the fiber is shown for the condition in which a small region of low index material is to exist at the center of the first ring.

In the above two embodiments the first series of rings is kept constant while the other series of rings is made to increase in thickness. Further operative embodiments within the scope of this invention include the situation where both the first and second series of rings are made to either decrease or increase. Satisfactory results have also been obtained where the first series of rings decreases in thickness from a relatively thick region at the core section to a relatively thin region near the perimeter of the waveguide. The second series of rings was made to correspondingly increase from a relatively thin thickness at the core out to a relatively thick region near the perimeter of the waveguide. In general, the best results are obtained when the first series of rings are made from a material having an index of refraction $n_1$ greater than the index of refraction $n_2$ of the second series of rings, and the thickness of the first series of rings decreases outwardly from center while the thickness of the second series of rings increases outwardly from center.

Where closely controlled effective refractive index gradients are required it is desirable to use a larger number of concentric rings and to vary the thickness of the individual rings over a wider range. An example of a closely controlled effective index gradient fiber can be seen at FIG. 4 where a high index material $n_1$ is used in the first series of rings and the low index of refraction material $n_2$ is used in the second series of rings. In this embodiment it is noted that the thickness of the first series of rings decreases outwardly whereas the thickness of the second series of rings increases outwardly. Depending upon the exact degree of effective index gradient requirement the number of rings and their thickness can be appropriately chosen. This can be seen by noting the embodiment of FIG. 4 where the fiber 3 has a series of first consecutive rings of index of refraction $n_1$ and a series of second consecutive rings having an index of refraction $n_2$. The first index of refraction profile 5, where the refractive index of the first series $n_1$ is greater than the refractive index for the second series $n_2$, shows an effective graded refractive index 9 indicated by the downwardly concave curve.

Figure 5:
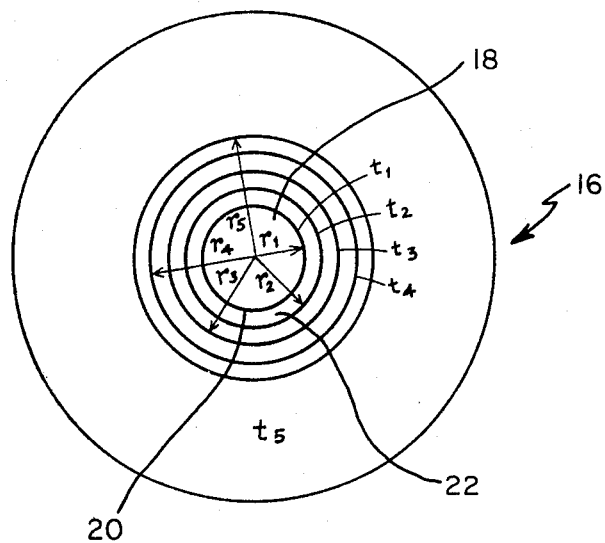
FIG. 5 is a characteristic representative of an example of an optical fiber having an effective graded index of refraction profile in accordance with the teachings of this invention.

FIG. 5 is an example of an optical fiber having an effective graded index of refraction profile. The following table gives illustrative radii and thickness for producing an optical fiber which has an effective index of refraction profile such that the intensity of the light decreases exponentially from the central axis of the fiber radially outward. The thicknesses and indices of refraction of example of the optical fiber of this invention illustrated in FIG. 5 are set forth below:

TABLE I

| | |
|---|---|
| $r_1 = 3$ μm | $n_1 = 1.5$ |
| $t_1 = 0.1$ μm | $n_2 = 1.46$ |
| $r_2 = 4.24$ μm | $n_1$ |
| $t_2 = 0.2$ μm | $n_2$ |
| $r_3 = 5.2$ μm | $n_1$ |
| $t_3 = 0.3$ μm | $n_2$ |
| $r_4 = 6.0$ μm | $n_1$ |
| $t_4 = 0.4$ μm | $n_2$ |
| $r_5 = 7.1$ μm | $n_1$ |
| $t_5 = 13.7$ μm | $n_2$ |

As set forth in Table I and as shown in FIG. 5, the optical fiber 16 comprises a plurality of concentric rings of material surrounding a central core 18 having an index of refraction, $n_1$ equal to 1.5 and a radius of 3 μm which is surrounded by a first concentric ring 20 has a thickness of 0.1 μm and an index of refraction which is lower, and in this case $n_2$ is equal to 1.46. The next concentric ring 22 is again a material having the index of refraction $n_1$, and each of the concentric rings alternate in such a manner as to have a plurality of first and second concentric rings surrounding a core which are successively arranged so as to produce in the small inner light guiding region having a radius of about 6.3 μm and an outside diameter of about 40 μm. In the fiber 16 the maximum propagation angle of light undergoing total internal reflection is governed by $n_1$ and $n_2$. The light intensity in each of the regions however, is changed somewhat by the low index barrier layers. Each of the barrier layers is a fraction of a wavelength in thickness and acts as a frustrated total internal reflecting boundary. The light intensity thus distributes in the radial direction in decreasing amplitudes. The amplitude decrease is a function of layer thickness. The decrease is given approximately by the formula $$I = I_o e^{-t/\lambda}$$

where t is the layer thickness and $\lambda$ is the operating wavelength and $I_o$ is the intensity of light at the innermost region. For the structure illustrated in FIG. 5 the intensity is exponentially decreasing. Thus, the embodiment illustrated in FIG. 5 provides an optical fiber 16 having an effective graded index of refraction profile.

It should be noted that if the layer thickness is large compared to the wavelength, very little of the energy in the inner region will be coupled to the outer layer. In that instance the separate regions could be considered as separate light guiding cores much in the manner as described in U.S. Pat. No. 4,000,416 assigned to the same assignee as this application.

On the other hand the optical fiber in accordance with the teachings of this invention is one in which the regions having the same index of refraction will couple, i.e. each of the innermost regions to the outermost regions and provide an optical fiber 16 which has an effective graded index of refraction profile.

Although an optical waveguide having the effective index of refraction profile of this invention finds immediate application in the field of optical communications, this is in no way intended as a limitation in the scope of the invention. The optical waveguide of this invention finds application wherever effective index of refraction profile fibers may be required.

What is claimed is:

1. An optical waveguide core having an effective graded index of refraction profile, comprising:
    a plurality of first and second alternating, concentric regions of light transmissive material, each of said first regions having a first index of refraction and substantially equal thicknesses, each of said second regions having a second index of refraction lower than said first index and successively increasing thicknesses in an outwardly direction from the innermost region of said core so that the effective index of refraction correspondingly decreases outwardly from the core center, the relationship of the thicknesses of said first and second concentric regions of light transmissive material being such as to produce a single waveguide core having an effective graded index of refraction profile.

2. An optical waveguide core as described in claim 1, wherein said first regions comprise silica in combination with at least one compound having a higher index of refraction than silica.

3. An optical waveguide core having an effective graded index of refraction profile, comprising:
    a plurality of first and second alternating concentric regions of light transmissive material, said first regions having a first index of refraction and successively decreasing thicknesses in an outwardly direction from the innermost region of the core, said second regions having a second index of refraction lower than said first index and succesively increasing thicknesses in an outwardly direction from the core center so that the effective index of refraction correspondingly decreases outwardly from the core center.

4. An optical waveguide core having an effective graded index of refraction profile, comprising:
    a central cylindrical region of light transmissive material having a first index of refraction;
    a ring of light transmissive material disposed about said central region and having a second index of refraction lower than said first index; and
    a plurality of first and second alternating concentric annular rings of light transmissive material disposed about said ring of light transmissive material, each of said first annular rings having said first index of refraction and having substantially equal thicknesses, each of said second annular rings having said second index of refraction, each of said rings having said second index of refraction having thicknesses that increase successively in an outwardly direction from the innermost region of said core so that the effective index of refraction correspondingly decreases outwardly from the core center, the relationship of the thicknesses of the rings having the first and second indices of refraction being such as to produce a single waveguide core having an effective graded index of refraction profile.

5. An optical waveguide core as described in claim 4, wherein the rings having the second index of refraction have a thickness which will facilitate evanescent coupling of light between the adjacent light transmissive material having the first index of refraction.

6. An optical waveguide core having an effective graded index of refraction profile, comprising:
    a central cylindrical region of light transmissive material having a first index of refraction;
    a ring of light transmissive material formed around said central region and having a second index of refraction lower than said first index; and
    a plurality of first and second alternating concentric annular rings of light transmissive material formed around said ring, said first annular rings having said first index of refraction and thicknesses decreasing successively in an outwardly direction from the innermost ring of the core, said second annular rings having said second index of refraction, said rings having the second index of refraction having thicknesses that increase successively in an outwardly direction from the innermost ring of said core so that the effective index of refraction of the core decreases in an outwardly direction from the core center, the relationship of the thicknesses of the rings of said first and second index of refraction material being such as to produce a single waveguide core having an effective graded index of refraction profile.

7. An optical waveguide core as described in claim 6, wherein the rings having the second index of refraction have a thickness which will facilitate evanescent coupling of light between the adjacent light transmissive material having the first index of refraction.

8. An optical waveguide core as described in claim 1 or 3, wherein said core is adapted to transmit light of a predetermined wavelength and the thicknesses of the second regions are a fraction of said predetermined wavelength.

9. An optical waveguide core as described in claim 4 or 6, wherein said core is adapted to transmit light of a predetermined wavelength and each of the second alternating concentric annular rings having a thickness that is a fraction of the predetermined wavelength.

* * * * *